United States Patent [19]

Wang et al.

[11] Patent Number: 5,053,180

[45] Date of Patent: * Oct. 1, 1991

[54] PROCESS FOR DEFORMATION OF AMORPHOUS POLYMERS

[75] Inventors: Paul T. Wang, Murrysville; Darral V. Humphries, Lower Macungie; John H. Milsom, Allegheny Township, Westmoreland County, Pa.

[73] Assignee: Aluminum Company of America, Pittsburgh, Pa.

[*] Notice: The portion of the term of this patent subsequent to Dec. 6, 2005 has been disclaimed.

[21] Appl. No.: 387,170

[22] Filed: Jul. 31, 1989

Related U.S. Application Data

[63] Continuation-in-part of Ser. No. 933,951, Nov. 24, 1986, Pat. No. 4,874,657, which is a continuation-in-part of Ser. No. 268,405, Nov. 8, 1988, Pat. No. 4,956,140, Continuation-in-part of Ser. No. 806,994, Dec. 9, 1985, Pat. No. 4,789,514.

[51] Int. Cl.⁵ .................... B29C 55/16; B29C 55/18
[52] U.S. Cl. .................... 264/290.2; 264/292; 264/346; 264/DIG. 73; 425/371; 425/DIG. 53
[58] Field of Search .................. 264/288.4, 290.2, 291, 264/292, DIG. 73, 346; 425/DIG. 153, 371

[56] References Cited

U.S. PATENT DOCUMENTS

| | | | |
|---|---|---|---|
| 4,230,658 | 10/1980 | Matsukura et al. | 264/290.2 |
| 4,282,277 | 8/1981 | Austen et al. | 428/36 |
| 4,310,485 | 1/1982 | Dauber | 264/288.4 |
| 4,501,797 | 2/1985 | Super et al. | 264/290.2 |
| 4,501,798 | 2/1985 | Koschak et al. | 264/290.2 |
| 4,522,867 | 6/1985 | Hill, Jr. et al. | 264/290.2 |
| 4,629,650 | 12/1986 | Kataoka | 428/213 |
| 4,668,729 | 5/1987 | Kataoka | 264/290.2 |
| 4,789,514 | 12/1988 | Lo | 264/280 |
| 4,874,657 | 10/1989 | Lo et al. | 264/290.2 |
| 4,877,393 | 10/1989 | Lo | 425/383 |
| 4,956,140 | 9/1990 | Rolles et al. | 425/394 |

Primary Examiner—Jay H. Woo
Assistant Examiner—Khanh P. Nguyen
Attorney, Agent, or Firm—Glenn E. Klepac

[57] ABSTRACT

A process for biaxially orienting amorphous polymers such as polymethyl methacrylate. The process includes steps of biaxially orienting a feedstock material in a deformation zone; reducing temperature of the material in a cooling zone; and annealing the material in an annealing zone. The process and apparatus produce a biaxially oriented material having enhanced optical quality and impact strength.

15 Claims, 3 Drawing Sheets

PROCESS FOR DEFORMATION OF AMORPHOUS POLYMERS

CROSS-REFERENCE TO RELATED APPLICATIONS

This application is a continuation-in-part of Lo et al, U.S. Ser. No. 933,951 filed Nov. 24, 1986 (now U.S. Pat. No. 4,874,657 issued Oct. 17, 1989) and Rolles et al. U.S. Ser. No. 268,405 filed Nov. 8, 1988 (now U.S. Pat. No. 4,956,140 issued Sept. 11, 1990). The Rolles et al. application was a continuation-in-part of the Lo et al. application. The Lo et al. application was a continuation-in-part of Lo U.S. Ser. No. 806,994 filed Dec. 9, 1985 (now U.S. Pat. No. 4,789,514 issued Dec. 6, 1988). The disclosures of U.S. Pat. Nos. 4,789,514; 4,874,657; 4,877,393; and 4,956,140 are incorporated herein by reference. This application is also related to PCT/US88/01569 filed May 11, 1988 and to Chilko et al U.S. Ser. No. 461,656 filed Jan. 9, 1990.

FIELD OF THE INVENTION

The present invention relates to a process for producing a biaxially oriented amorphous polymer product having improved surface quality and to an apparatus for carrying out such process. More particularly, the invention is directed to a process wherein an amorphous polymer feedstock is advanced between at least one pair of opposed belts. As used herein, the term "amorphous polymer" means a polymer selected from the group consisting of polymethyl methacrylate, polyvinyl chloride, polystyrene, polycarbonate, amorphous polyamides, polyarylates, and mixtures thereof.

BACKGROUND OF THE INVENTION

Biaxially oriented polymers have numerous advantages over unoriented polymers in that they possess higher strength, improved stiffness, increased toughness, and superior thermoformability. Biaxially oriented polymers have been successfully produced using techniques disclosed in Austen et al U.S. Pat. No. 4,282,277, the disclosure of which is incorporated herein by reference. Austen et al describe a process wherein a tubular product is initially produced by hydrostatic extrusion using a mandrel in combination with a conical die. The tubular product is then cut, flattened, and annealed utilizing expensive flattening and annealing equipment. While the mandrel-conical die approach results in excellent biaxial orientation of structures, it is necessary to expend considerable effort to remove residual curvature in the resulting sheet. Even when the curvature has been removed by reconfiguring the extruded tube into a flat sheet, residual and unbalanced stresses and strains in the original tube tend to subsequently reassert themselves, resulting in difficulties when using the sheet.

In order to avoid the expense of first forming a tube and subsequently slitting and flattening the tube to form a biaxially oriented sheet, a twin-belt process has been developed wherein lower pressures are required to produce biaxial orientation than comparable processes using stationary flat dies. In actual experiments, pressures of 7,000 psi (492 kg/cm$^2$) were required for flat dies whereas pressures of only 800 psi (56.2 kg/cm$^2$) were required for twin-belt machines. Because the flat die machines utilize higher extrusion pressures, they require much greater initial capital outlays than twin-belt apparatus.

While biaxially oriented sheet can be produced by platen forging and cross-rolling, each of these processes has the drawback of being a batch process as opposed to a continuous process and therefore has serious size and economic limitations. Consequently, it is difficult to produce elongated sheets of material. In addition, with sheet forged between parallel platens, the sheet must be produced from a circular blank in order to have uniform biaxial orientation. The blank must then be trimmed which adds an additional step and wastes material. While sheets produced by cross-rolling have a roughly rectangular shape, they exhibit wavy surfaces resulting from non-uniform elastic spring back of sheet emerging from the roll nip and consequently are not necessarily suitable for subsequent shaping and forming. Moreover, due to short deformation times in cross-rolling, the resulting elastic spring back leads to a reduction of desirable properties such as stiffness.

As set forth in the above-mentioned patent applications, 933,951; 268,405; and 277,815, biaxial orientation of thermoplastic sheet in continuous twin-belt processes requires at least three major steps. The first step is transport of thick polymer slabs by belts through an angled deformation zone where the slabs are squeezed so that the material flows both parallel and perpendicular to the extent of the belts and is biaxially oriented. Secondly, the biaxially oriented sheet is passed through a zone where the belts are parallel and wherein the molecular structure of the material is heat set or annealed. Finally, the sheet which has been annealed is transported through a cooling zone in order to reduce the temperature of the sheet to a level below its heat deflection temperature so that the sheet remains flat.

The twin-belt process makes an excellent product when used on semi-crystalline materials such as polyethylene, polypropylene, polybutylene, polyacetal, polyamide, polyethylene terephthalate, and polybutylene terephthalate. Twin-belt processing of amorphous polymers also provides significant improvements in strength, stiffness, and toughness. However, surface characteristics of amorphous polymers are difficult to control when run through an apparatus having steel belts. While smooth belt surfaces and belt lubrication provide some improvement in surface quality, the resulting product is still not commercially acceptable unless more drastic steps are taken to reduce sheet surface roughness. Twin-belt processing has heretofore been uneconomical for amorphous polymers because of the extra cost of surface treatment after the material is biaxially oriented.

Kataoka U.S. Pat. No. 4,629,650 describes a process for compression molding a thermoplastic resin. A removable skin layer is interposed between the surface of a mold or die and a thermoplastic core resin to be molded. An interface between the skin layer and mold or die is lubricated by dispersion of a liquid lubricant. The resin core is then compression molded at a temperature equal to or greater than the glass transition temperature. The patent discusses compression molding of polymethyl methacrylate and various other amorphous polymers with polyolefin and polyamide skin layers. Two claimed advantages are lower compression forces to produce biaxial orientation and improved surface smoothness. However, the patent does not mention twin-belt processing of amorphous polymers or a separate annealing step to improve surface quality.

It is a principal objective of the present invention to provide a process and apparatus for producing a biaxially oriented amorphous polymer product having commercially acceptable surface quality.

A related objective of the invention is to provide a process for biaxially orienting amorphous polymer materials that can be carried out continuously in a twin-belt apparatus.

Additional objects and advantages of the invention will become apparent to persons skilled in the art from the following detailed description.

SUMMARY OF THE INVENTION

In accordance with the present invention, there is provided a process and apparatus for biaxially orienting amorphous polymers. The process comprises successive steps of biaxially orienting a feedstock material in a deformation zone; reducing temperature of the material in a cooling zone; and annealing the material in an annealing zone. The amorphous polymer is preferably selected from the group consisting of polymethyl methacrylate, polyvinyl chloride, polystyrene, polycarbonate, amorphous polyamides, polyarylates, and mixtures thereof. Polymethyl methacrylate is particularly preferred.

The material is biaxially oriented by introducing a solid slab or billet of polymer feedstock between a first pair of opposed belts which converge in a downstream direction. The belts converge toward the feedstock at an angle which is less than about 6°. The angle utilized depends upon several factors such as polymer composition, surface friction, workpiece width and thickness and workpiece temperature.

The opposed belts define a deformation zone wherein the feedstock material is engaged between the belts, heated, and squeezed or compressed in such a manner that the material is elongated longitudinally, spread laterally, and reduced in thickness. The material is heated to a first temperature above its glass transition temperature but below its viscous flow temperature. Preferably, the first temperature is closer to the viscous flow temperature than the glass transition temperature. For example, in biaxially orienting polymethyl methacrylate (PMMA) having a glass transition temperature of about 105° C. and a viscous flow temperature of about 155° C., a particularly preferred process temperature is about 145° C. This temperature may be varied between about 125° C. and 150° C. for PMMA. Biaxial orientation in the deformation zone increases strength and stiffness of the material.

The opposed belts move the feedstock downstream to a cooling zone wherein the material is cooled to a second temperature which is preferably slightly above the glass transition temperature. The cooling zone is preferably defined by the same first pair of opposed belts forming the deformation zone. However, in the cooling zone, the belts are preferably parallel rather than converging at an angle in a downstream direction as in the deformation zone. Consequently, in the cooling zone, compression on the material is reduced or relaxed as it moves downstream. Cooling the material in the cooling zone prevents springback or return of the material to its original, unoriented condition.

A thin thermoplastic resin film is preferably interposed between the amorphous polymer material and surface portions of the belts in the deformation and cooling zones. This film is removed as the material leaves the first pair of belts. The film preferably comprises a polyolefin, polytetrafluoroethylene, or a polyamide, with polypropylene being particularly preferred.

Other suitable film materials are polyethylene, polyethylene-polypropylene copolymers, polybutylene; and polybutylene-polyethylene copolymers. The film has a thickness of about 10 to 12 mils (about 250–300 microns).

An interface between the thermoplastic resin film and surface portions of the belts is preferably lubricated with a liquid lubricant. Some suitable liquids are mineral oil, low molecular weight polyethylene, silicone oils, glycerol trioleate, various polyglycols, and synthetic branched chain polyolefins.

Surface quality of the polymer material is dramatically enhanced by providing an annealing zone downstream from the cooling zone wherein the material is maintained above its glass transition temperature and below its viscous flow temperature. The temperature in the annealing zone is preferably closer to the glass transition temperature than the viscous flow temperature. A second pair of opposed belts define the annealing zone and preferably compress the material while moving it downstream. The material is kept in the annealing zone for a sufficient time to reduce surface irregularities to an acceptable level. For polymethyl methacrylate, a suitable range of annealing times and temperatures is about 1–5 minutes at about 106°–120° C.

The opposed mirror surface belts in the annealing zone compress the polymer material as it moves downstream. The belts preferably compress the material at a pressure level that is more than half the highest pressure maintained in the deformation zone. Best surface finish is attained when pressure in the annealing zone is maintained at about the highest level of compression in the deformation zone throughout at least most of the annealing zone. In a particularly preferred embodiment, the highest pressure in the deformation zone and the pressure in the annealing zone are both about 1200 psig.

The process of the invention is applicable generally to molding processes for PMMA wherein improved surface quality and increased strength are desired. Such molding may be accomplished by means of an extrusion mold or die as in Kataoka U.S. Pat. No. 4,629,650 or with a set of platen-backed belts as described herein. The disclosure of said Kataoka patent is incorporated by reference to the extent consistent with the present invention.

A removable thermoplastic film, preferably polypropylene, is provided between the PMMA feedstock and the mold or die or belt. The feedstock is molded at a first temperature above its glass transition temperature but below its viscous flow temperature. The first temperature is preferably closer to the viscous flow temperature than the glass transition temperature and is optimally about 145° C. Sufficient pressure is applied through the mold or die or belt to achieve a state called "plug flow" in the PMMA. The removable polypropylene film has greater flowability than the PMMA feedstock and less than about one-tenth of its thickness. A liquid lubricant is preferably dispersed between the film and mold or belt or die.

The biaxially oriented PMMA is cooled to a second temperature below its first temperature. The second temperature is preferably about 105°–125° C. The cooled PMMA is annealed under compression for a sufficient time to reduce surface irregularities, at a temperature above the glass transition temperature but below the viscous flow temperature. The annealing temperature is preferably about 106°–120° C. Pressure is applied by opposed belts having smooth surfaces. The annealed PMMA is then cooled below its glass transition temperature and pressure is released.

DETAILED DESCRIPTION OF A PREFERRED EMBODIMENT

Figure 1:
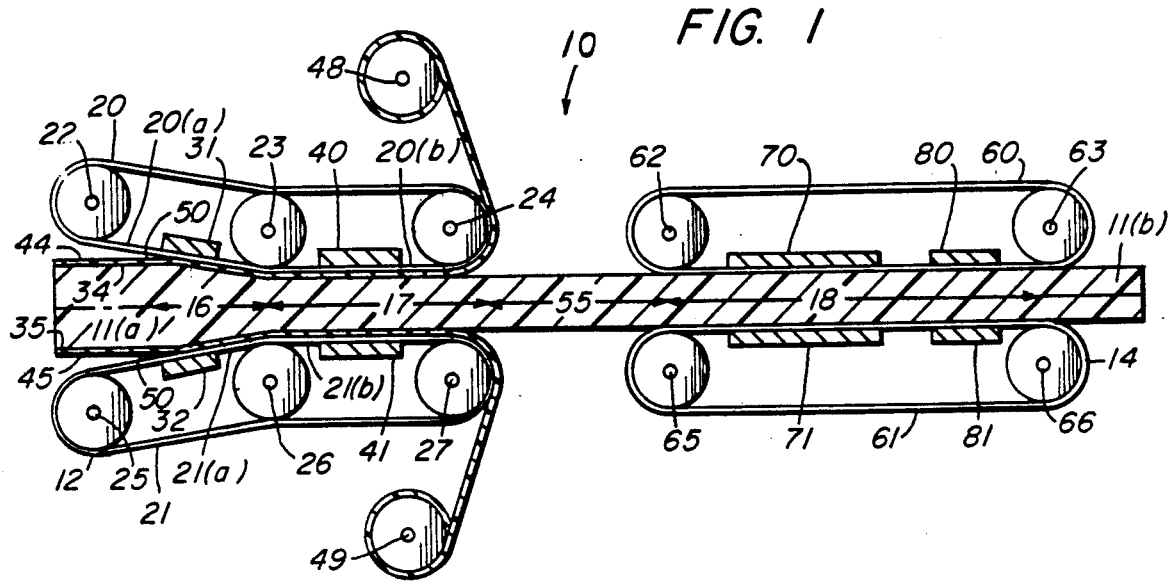
FIG. 1 is a schematic cross-sectional view of a preferred apparatus for carrying out the process of the present invention.

Referring now to FIG. 1, there is shown a twin-belt processing apparatus 10, in which an amorphous polymer feedstock 11(a) is formed into biaxially oriented, stabilized sheet 11(b). The apparatus 10 receives amorphous PMMA feedstock 11(a) at its upstream end 12 and dispenses biaxially oriented sheet 11(b) at its downstream end 14. The twin-belt press 10 includes a deformation zone 16 wherein the material is heated and biaxially oriented; a cooling zone 17 wherein the material is cooled while being restrained; and an annealing zone 18 wherein the material is compressed and retained at a temperature above its glass transition temperature for a sufficient time to reduce surface irregularities. Just before leaving the annealing zone 18, the oriented and annealed sheet 11(b) is cooled below its glass transition temperature.

The workpiece 11(a) is optimally produced just upstream of the twin-belt machine 10 of FIG. 1 by feeding pellets (not shown) of an amorphous polymer material into an extruder (not shown), extruding the workpiece and feeding it directly into the apparatus 10 as a continuous body. Alternatively, the workpiece 11(a) can be made into a continuous sheet by end-to-end heat welding of billets (not shown) produced elsewhere.

The apparatus 10 includes a first pair of opposed belts 20, 21. The upper belt 20 is supported by upper rollers 22, 23, 24 and the lower belt 21 is supported by lower rollers 25, 26, 27. Angled portions 20(a), 21(a) of the belts define a deformation zone 16 wherein the material is heated and biaxially oriented. Downstream portions 20(b), 21(b) of the belts extend parallel to each other defining a cooling zone wherein the material is cooled while being restrained.

The belts 20, 21 are preferably made of chrome plated steel, are seamless, and have a hardness of at least 45 Rockwell C. As shown in FIG. 1, angled portions 20(a), 21(a) of the belts are urged into substantially uniform engagement with the feedstock 11(a) by a first pair of opposed, upper and lower heated platens 31 and 32, respectively. The platens or first heating means 31, 32 engage interior portions of the respective belts 20, 21. The entry angle between an upper surface portion 34 of the feedstock 11(a) and upper belt 20 is approximately 3°. Similarly, a lower entry angle between a lower surface portion 35 of the feedstock 11(a) and the lower belt 21 is also approximately 3°.

Belt portions 20(b) and 21(b) adjacent the cooling zone 17 are cooled by a first pair of upper and lower cooling platens or first cooling means 40, 41. In a preferred embodiment involving processing of PMMA, the heating platens or first heating means 31, 32 heat the feedstock 11(a) to a temperature of approximately 145° C., and the first cooling means 40, 41 cool the material to approximately 106° C.

Both principal surfaces of the PMMA feedstock 11(a) are protected by thermoplastic polymer films. An upper film 44 covers the upper surface 34 and a lower film 45 covers the lower surface 35. The films 44, 45 are made from a polypropylene homopolymer and have a thickness of about 0.25 mm (10 mils) in the preferred embodiment described here. After leaving the cooling zone 17, the films 44, 45 are retracted from the biaxially oriented sheet by respective reels 48, 49. Interfaces between the belts 20, 21 and films 44, 45 are lubricated with mineral oil 50.

After leaving the cooling zone 17, the material passes through a short gap 55 before encountering a second pair of belts 60, 61. The material must remain in the cooling zone 17 for a sufficient time to reduce internal stresses so that severe springback is avoided in the gap 55. The material generally stays in the cooling zone about 30–60 seconds. The upper belt 60 is supported by upper rollers 62, 63, and the lower belt 61 is supported by lower rollers 65, 66. Surface portions of the finishing belts 60, 61 adjacent the sheet 11 are provided with a polished mirror surface. The belts 61, 62 define an annealing zone 18 wherein the PMMA is compressed, preferably at 800 psig. The sheet 11 is also heated by heating platens or second heating means 70, 71 to a temperature of about 106° C. which is slightly above its glass transition temperature. Before leaving the annealing zone 18, the material is cooled by cooling platens or second cooling means 80, 81 to a temperature below the glass transition temperature.

Figure 2:
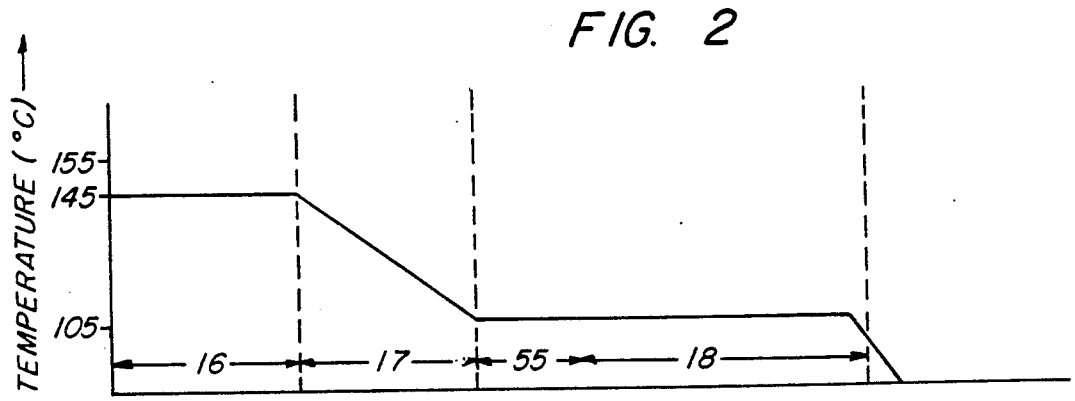
FIG. 2 is a temperature profile for polymethyl methacrylate when processed in accordance with the invention.

FIG. 2 shows a temperature profile for PMMA in the preferred process and apparatus of the invention. The feedstock 11(a) is kept at a temperature of approximately 145° C. in the deformation zone 16. In the cooling zone 17, the sheet cools steadily until it reaches about 106° C. The second heating means 70, 71 is adjusted to maintain a steady temperature of about 106° C. throughout most of the annealing zone 18. Just before leaving that zone 18, the second cooling means 80, 81 cools the biaxially oriented PMMA sheet 11(b) below its glass transition temperature.

Figure 3:
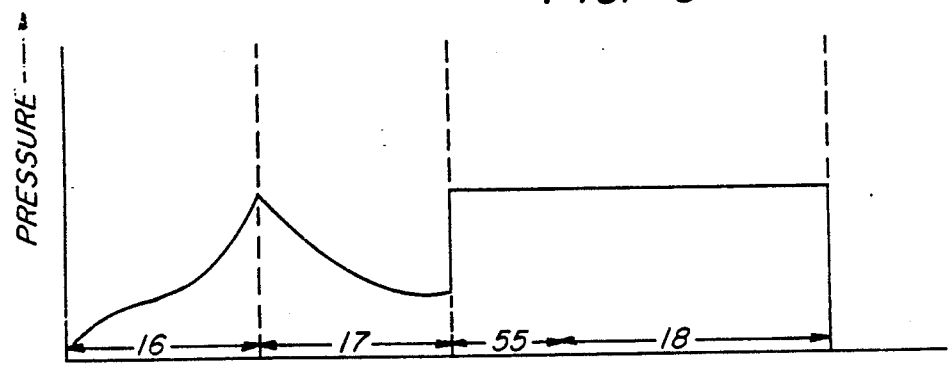
FIG. 3 is a pressure profile for polymethyl methacrylate when processed in accordance with the invention.

FIG. 3 shows a pressure profile for PMMA throughout the process. Pressure is gradually increased in the deformation zone 16 to a maximum of approximately 800 psig. Gradual relaxation occurs in the cooling zone 17, and no pressure is applied in the gap 55. The opposed mirror surface belts 60, 61 apply a pressure of about 800 psig to the sheet 11 as it moves downstream in the annealing zone 18. For PMMA, pressure in the annealing zone 18 is preferably more than one-half the pressure in the deformation zone 16.

Figure 4:
FIG. 4 is a photograph of the surface of a PMMA sheet biaxially oriented in accordance with prior art techniques.
Figure 5:
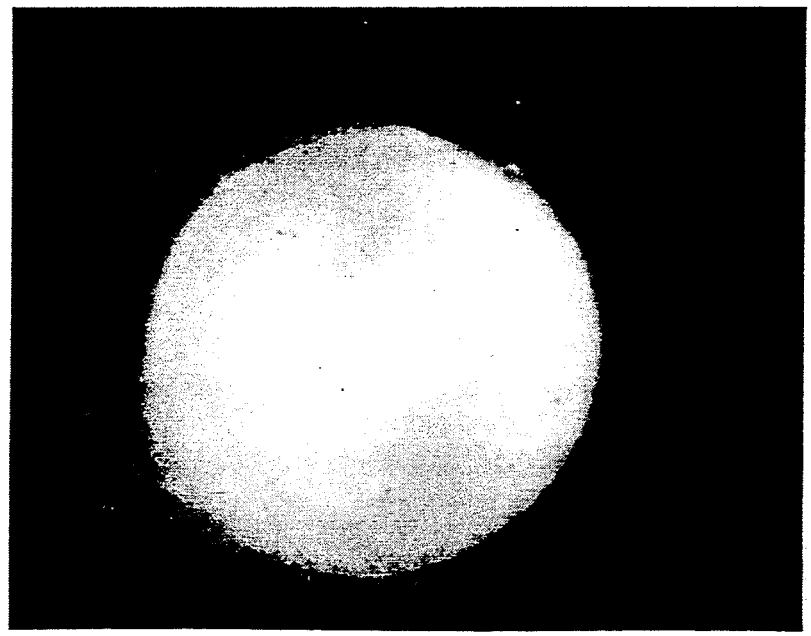
FIG. 5 is a photograph of the surface of a PMMA sheet processed in accordance with the present invention.

FIGS. 4 and 5 are photographs of PMMA sheet. FIG. 4 shows material processed in accordance with the prior art. FIG. 5 shows dramatic enhancement in surface appearance resulting from absence of striation lines in biaxially oriented PMMA sheet made in accordance with the present invention.

Figure 6:
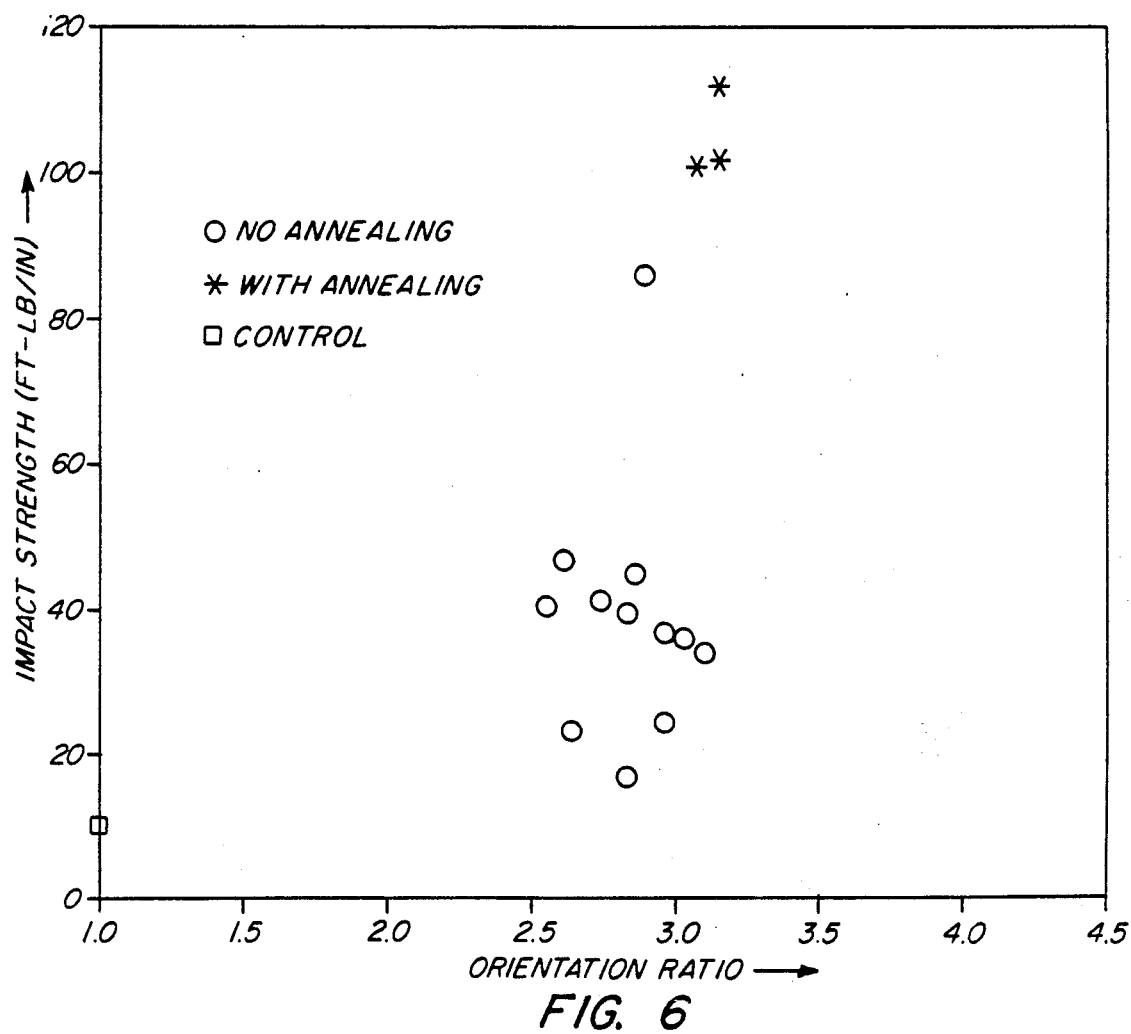
FIG. 6 is a graph showing impact strength for PMMA sheet as a function of orientation ratio.

FIG. 6 is a graph showing impact strength for PMMA sheet as a function of orientation ratio, processed with and without the annealing step of the present invention. The feedstock material was cast PMMA sheet having an initial thickness of 9.55 mm (0.376 in) in each case. Data points labeled "WITH ANNEALING" represent PMMA sheet treated in accordance with the present invention, with annealing at 106° C. and 800 psig. Data points labeled "NO ANNEALING" represent PMMA sheet biaxially oriented under conditions identical to the annealed sheet, but without the annealing step. Impact strengths were measured by a falling dart test. Orientation ratios were calculated from reduction in sheet thickness. The results show significant increases in impact strength at equivalent orientation ratios for all three PMMA samples treated in accordance with the present invention. Optical quality also improved significantly in all three samples.

Tables 1 and 2 show some examples of improvements in impact strength and optical quality of PMMA obtained through processing as claimed herein. The samples tested each had an initial thickness of 0.376 in (9.55 mm) and an area of 50 in². Table 1 shows impact strength of various PMMA samples, with and without the annealing step of the invention. The improvement in Sample 4 over Samples 1–3 demonstrates that the annealing step is best performed at or slightly above the glass transition temperature (105° C.) for best impact strength.

TABLE 1

Impact Strength of PMMA Under Various Process Conditions

| Sample | Deformation Zone | | Anneal Zone | | Impact Strength (ft-lb/in) |
|---|---|---|---|---|---|
| | Temperature (°C.) | Load (lb) | Temperature (°C.) | Load (lb) | |
| 1 | 145 | 40,000 | — | — | 53.22 |
| 2 | 125 | 40,000 | — | — | 24.13 |
| 3 | 145 | 40,000 | 125 | 40,000 | 55.34 |
| 4 | 145 | 40,000 | 105 | 40,000 | 104.33 |

Table 2 shows optical quality of four PMMA samples which were processed under different conditions. Sample 1 was not annealed and exhibited visible striations even though a polypropylene (PP) film was interposed between the PMMA sample and platen during deformation. Samples 2 and 3 both had improved appearance because they were annealed under compression. Sample 3 had the best appearance because total load during annealing was increased to an optimum level, 40,000 pounds, corresponding to a pressure of about 800 psig. In Sample 4, a polypropylene film was compression molded against an optical quality surface before being applied to the PMMA. Although surface quality was improved over Sample 1, the result did not approach Samples 2 and 3 because of the absence of any annealing step. Samples 1, 2, and 3 were all processed with "as received" polypropylene film.

TABLE 2

Optical Quality of PMMA Under Various Process Conditions

| Sample | Deformation Zone | | | Anneal Zone | | Optical Quality |
|---|---|---|---|---|---|---|
| | Temp. (°C.) | Load (lb) | Film | Temp. (°C.) | Load (lb) | |
| 1 | 145 | 40,000 | PP | — | — | Striated |
| 2 | 145 | 40,000 | PP | 107 | 20,000 | Improved |
| 3 | 145 | 40,000 | PP | 107 | 40,000 | Transparent (Best) |
| 4 | 145 | 40,000 | Molded | — | — | Less Striated |

TABLE 2-continued

Optical Quality of PMMA Under Various Process Conditions

| Sample | Deformation Zone | | | Anneal Zone | | Optical Quality |
|---|---|---|---|---|---|---|
| | Temp. (°C.) | Load (lb) | Film | Temp. (°C.) | Load (lb) | |
| | | | PP | | | Than 1 |

Surface microroughness measurements were performed on Samples 1 and 3 to quantify the effect of processing in accordance with the invention. Unannealed Sample 1 had average surface roughness of $2.53 \times 10^{-4}$ inch (6.43 microns). Surface roughness in Sample 3 was reduced by more than four times to only $5.63 \times 10^{-5}$ inch (1.43 microns). These results demonstrate significant improvements in surface roughness by twin-belt processing of PMMA as claimed herein.

While the invention has been described in terms of preferred embodiments, the claims appended hereto are intended to encompass all embodiments which fall within the spirit of the invention.

What is claimed is:

1. A process for producing a biaxially oriented amorphous polymer product having improved surface quality, said process comprising the steps of:
    (a) biaxially orienting an amorphous polymer material in a deformation zone by:
        (1) engaging the material between a first pair of opposed belts which converge in a downstream direction,
        (2) heating the material to a first temperature above its glass transition temperature but below its viscous flow temperature, and
        (3) moving the opposed belts downstream while squeezing the material so that it is elongated longitudinally, spread laterally and reduced in thickness,
    (b) in a cooling zone downstream from said deformation zone, reducing the temperature of the material to a second temperature below said first temperature, and
    (c) in an annealing zone downstream from said cooling zone,
        (1) annealing the material at a temperature above its glass transition temperature and below its viscous flow temperature for a sufficient time to reduce surface irregularities.

2. The process of claim 1 wherein step (c) further comprises:
    (2) pressing the material between a second pair of opposed belts.

3. The process of claim 2 wherein step (c) further comprises:
    (3) cooling the material below its glass transition temperature after steps (c)(1) and (c)(2).

4. The process of claim 1 wherein step (b) further comprises maintaining the material between said first pair of opposed belts.

5. The process of claim 4 wherein said material is selected from the group consisting of polymethyl methacrylate, polystyrene, and polyvinyl chloride, said process further comprising:
    (d) during steps (a) and (b), interposing a thermoplastic resin film between said material and surface portions of said belts.

6. The process of claim 5 wherein said film is selected from the group consisting of a polyolefin, polytetrafluoroethylene, and a polyamide.

7. The process of claim 5 wherein said film is polypropylene.

8. The process of claim 5 further comprising:
(e) after step (b) and before step (c), removing said thermoplastic resin film from between said material and said belts.

9. The process of claim 5 further comprising:
(f) lubricating an interface between said film and surface portions of said belts with a liquid lubricant.

10. The process of claim 9 wherein said liquid lubricant is selected from the group consisting of mineral oil, low molecular weight polyethylene, silicone oils, glycerol trioleate, polyglycols, synthetic branched chain polyolefins, and mixtures thereof.

11. The process of claim 1 wherein said material is an amorphous polymer selected from the group consisting of polymethyl methacrylate, polyvinyl chloride, polystyrene, polycarbonate, polyethylene, amorphous polyamides, polyarylates, and mixtures thereof.

12. The process of claim 1 wherein at least one of the belts in said first pair of opposed belts converges toward the material in a downstream direction at an angle of less than about 6°.

13. The process of claim 1 wherein portions of said first pair of opposed belts adjacent the material are provided with a polished surface.

14. The process of claim 2 wherein said second pair of opposed belts apply a pressure to the material in the annealing zone that is more than one-half the pressure in the deformation zone.

15. A process for producing biaxially oriented polymethyl methacrylate having improved surface quality comprising the steps of:
(a) in a deformation zone, biaxially orienting an amorphous polymer material comprising polymethyl methacrylate by:
   (1) engaging the material between a first pair of opposed belts which converge in a downstream direction,
   (2) heating the material to a first temperature greater than its glass transition temperature but less than its viscous flow temperature, and
   (3) moving the opposed belts downstream while squeezing the material so that it is elongated longitudinally, spread laterally, and reduced in thickness,
(b) in a cooling zone downstream from said deformation zone, reducing the temperature of said material to a second temperature below said first temperature,
(c) during steps (a) and (b), interposing a thermoplastic resin film between said material and surface portions of said belts, said film being selected from the group consisting of a polyolefin, polytetrafluoroethylene and a polyamide, and
(d) in an annealing zone downstream from said cooling zone, annealing the material at a temperature above its glass transition temperature and below its viscous flow temperature for a sufficient time to reduce surface irregularities, while pressing the material between a second pair of opposed belts, and
(e) cooling the material below its glass transition temperature.

* * * * *